Figure 1:
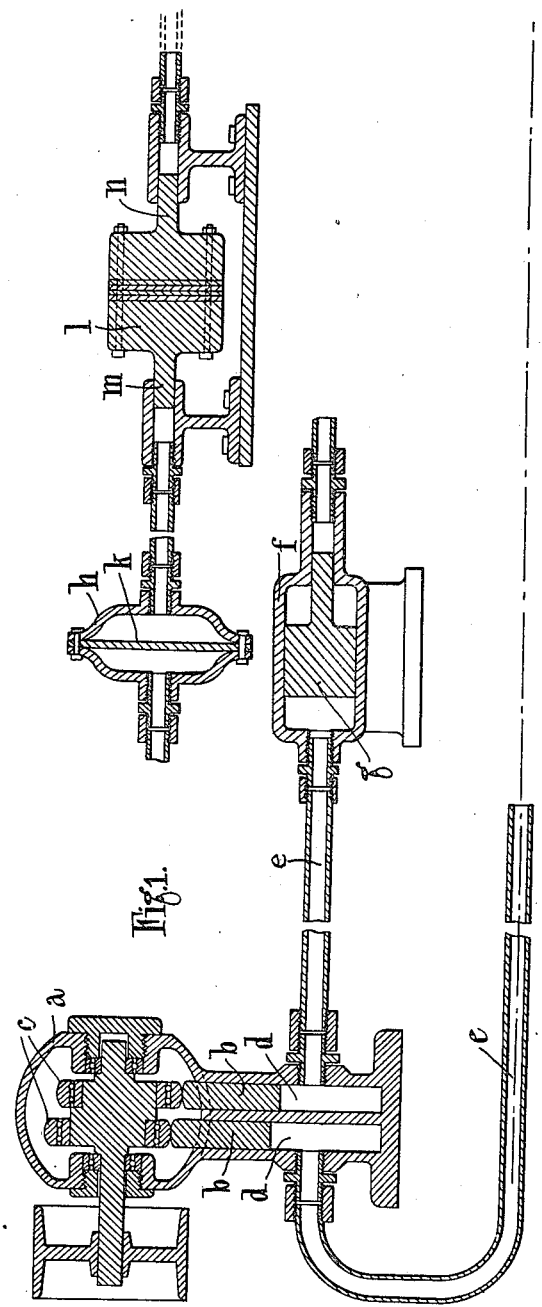

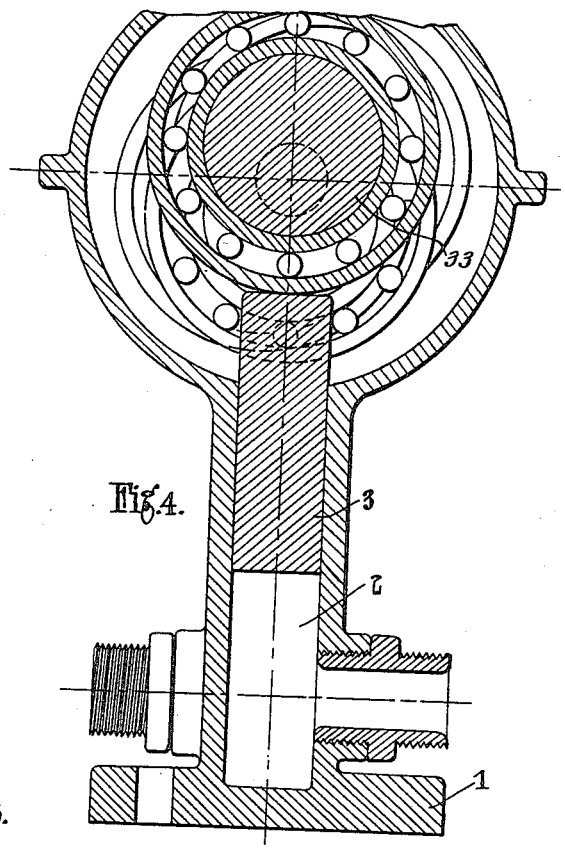
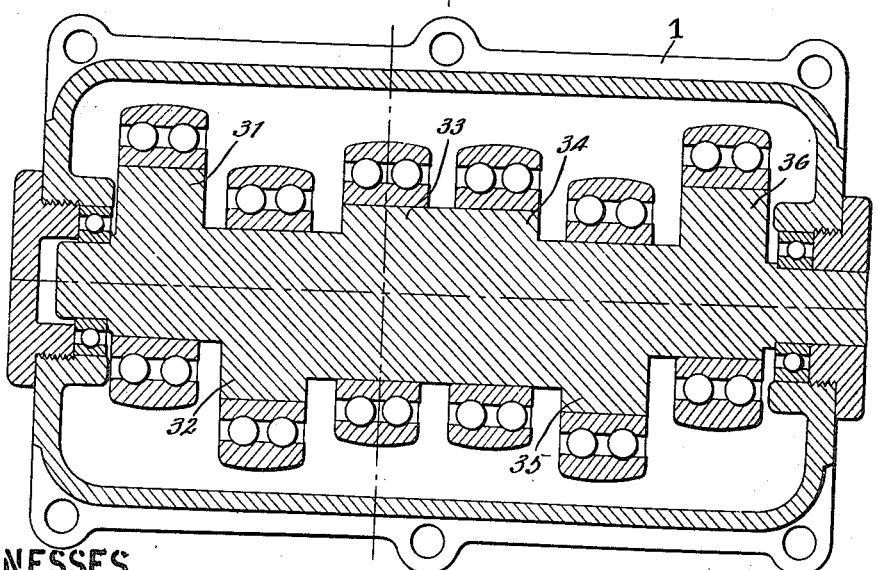

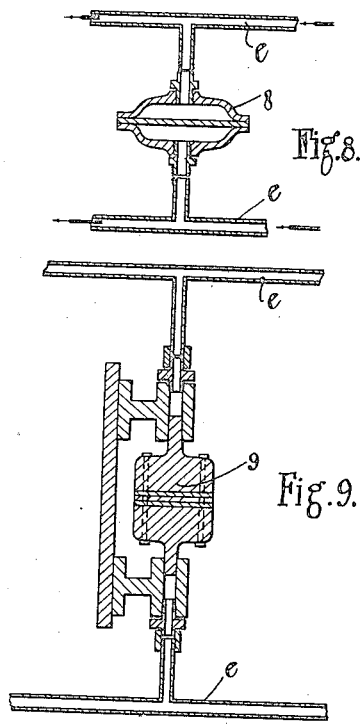
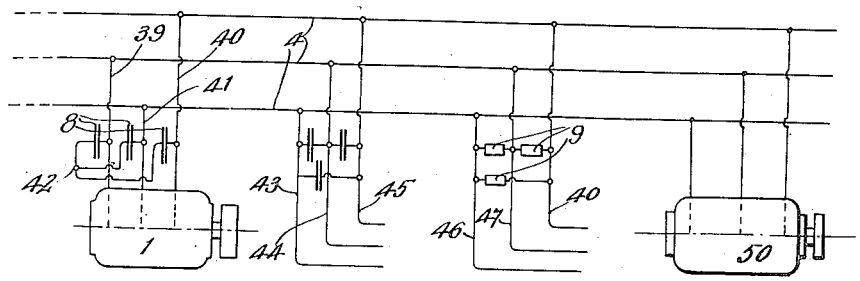

G. CONSTANTINESCO.
HYDRAULIC TRANSMISSION.
APPLICATION FILED APR. 4, 1914.

1,211,680.

Patented Jan. 9, 1917.
6 SHEETS—SHEET 6.

WITNESSES

Gogu Constantinesco
INVENTOR
BY
ATTORNEY

UNITED STATES PATENT OFFICE.

GOGU CONSTANTINESCO, OF LONDON, ENGLAND, ASSIGNOR OF ONE-HALF TO WALTER HADDON, OF LONDON, ENGLAND.

HYDRAULIC TRANSMISSION.

1,211,680.  Specification of Letters Patent.  Patented Jan. 9, 1917.

Application filed April 4, 1914. Serial No. 829,718.

*To all whom it may concern:*

Be it known that I, GOGU CONSTANTINESCO, a subject of the King of Roumania, of 8 Lichfield road, Kew Gardens, London, England, have invented certain new and useful Improvements in Hydraulic Transmission, of which the following is a specification.

The present invention relates to hydraulic transmission, and particularly to long distance transmission, of power.

The object of the present invention is to provide an apparatus which allows the hydraulic transmission of power to very great distances, or which allows periodic displacement of considerable volumes of liquid in the pipes, without occasioning excessive rises of pressure, and with the least possible loss of power.

Hitherto it has been found impossible to transmit power by hydraulic means in which reciprocation of a liquid column is required over any great distance, owing to the fact that the inertia of the liquid column gives rise to extremely high pressures in the pipes along which it is desired to transmit power, if the period of the oscillations and extent of movement of the liquid is above a very small quantity. According to this invention, the pressures can be reduced to practical amounts, although considerable powers are transmitted with oscillations of any desired frequency.

The invention consists broadly in the use of hydraulic condensers to counteract the effect of inertia in liquid columns, the condensers being placed in series in the pipes.

The invention also consists in means for transmitting energy by means of a series of periodic pressure variations, producing small periodic changes of pressure and volume throughout a liquid column, whereby energy is transmitted through the liquid in a manner analogous to that in which electric waves are propagated through space.

The invention further consists in arranging in the connection between a generator and receiver a hydraulic condenser, consisting of an elastic body dividing the column of liquid between the generator and the receiver.

The invention also consists in the use of a hydraulic transformer, such, for instance, as a differential piston between the generator and the receiver.

The invention further consists in the use of an additional inertia device, such, for instance, as a weighted piston situated between the generator and receiver.

The invention also consists in the apparatus for hydraulic transmission of power hereinafter described.

I have found by mathematical analysis that if the capacity C of a condenser formed by a piston of section $s$, held in a mean position by means of springs, be defined by the relation $$\Delta V = s\Delta f = C\Delta p$$

where $\Delta V$ is the variation of volume under variation of pressure, $\Delta p'$, and $\Delta f$ is the variation in length of the springs, and if I define the coefficient of inertia L of a weight submitted to a periodic pressure distributed over the surface $s'$ normal to the direction of movement of the weight by the relation $$p - p' = L\frac{di}{dt}$$

$p-p'$ being the difference of pressure acting on the surface $s'$, and $i$ being the flow of fluid across the section $s'$, and if I define the resistance R to flow in the pipes by the relation $$p - p' = Ri$$

where $i$ is the flow per second, it will be found that the effect of such capacities, inertias and resistances in liquid columns can be calculated in a manner analogous to that in which the effects of electrical capacity inertia and resistance can be calculated, the same equations being applicable to the two cases. And I have found by mathematical analysis that energy can be transmitted over very long distances without excessive pressures, by producing a series of periodic pressure variations which produce periodic changes of pressure and volume throughout a liquid column.

The function of the condenser and of the additional inertia devices of the applicant's invention are to obtain an apparatus in which the inertia and elasticity are such that the natural time period of vibrations of the liquid and other masses contained between the generator and the receiver vibrating under its own elasticity, is the same as the period of the periodic impulses which are impressed on the liquid column by the pistons of the generator. It will be seen that if these two time periods are equal, when once the system has been started vibrating, no further work will have to be done by the generator beyond that which is taken up by the receiver, the inertia of the liquid being counteracted by the capacity of the condenser. The only loss of energy is caused by friction. This is exactly analogous to the transmission of power by electric waves, and the same mathematical considerations apply to the two cases.

Figure 2:
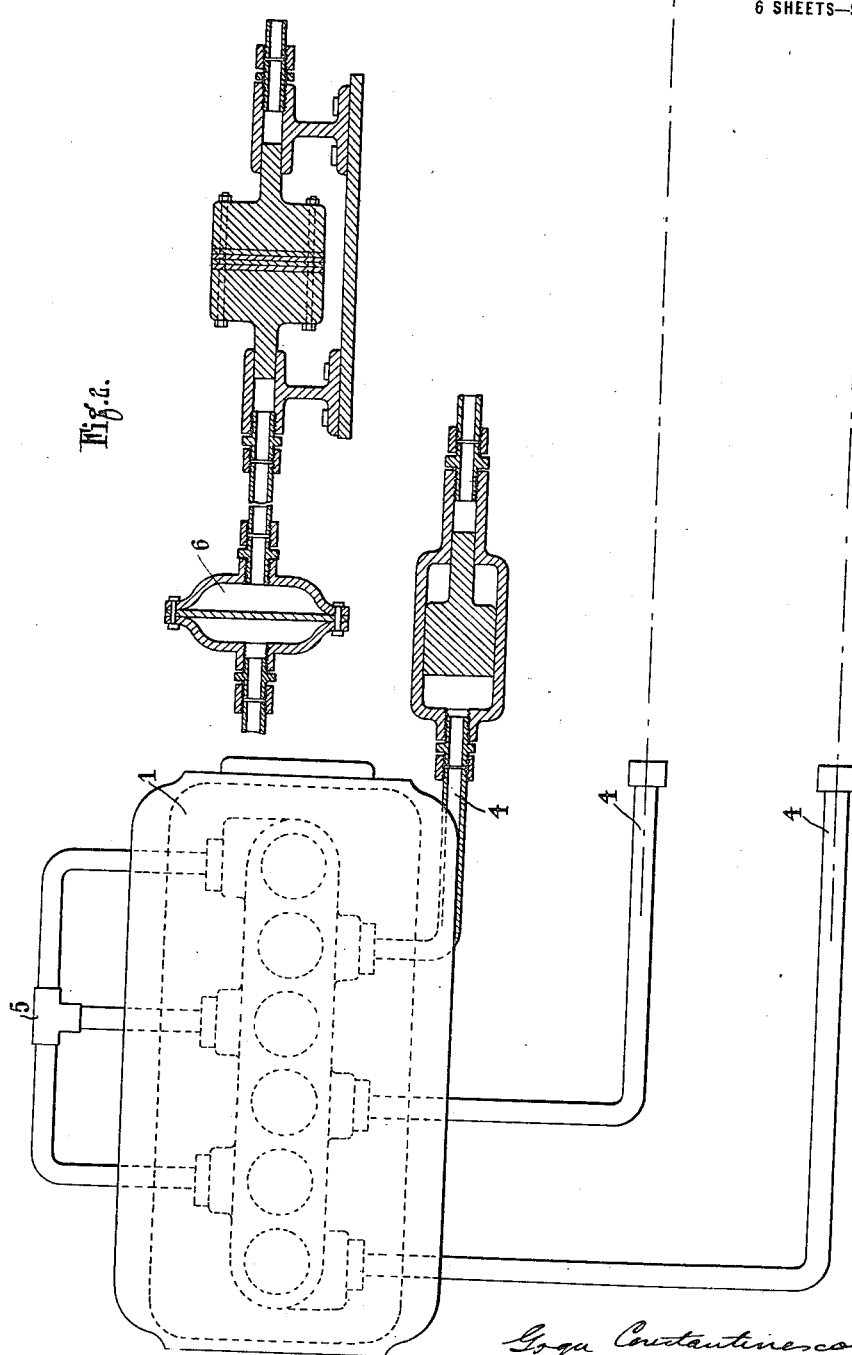
Figure 3:
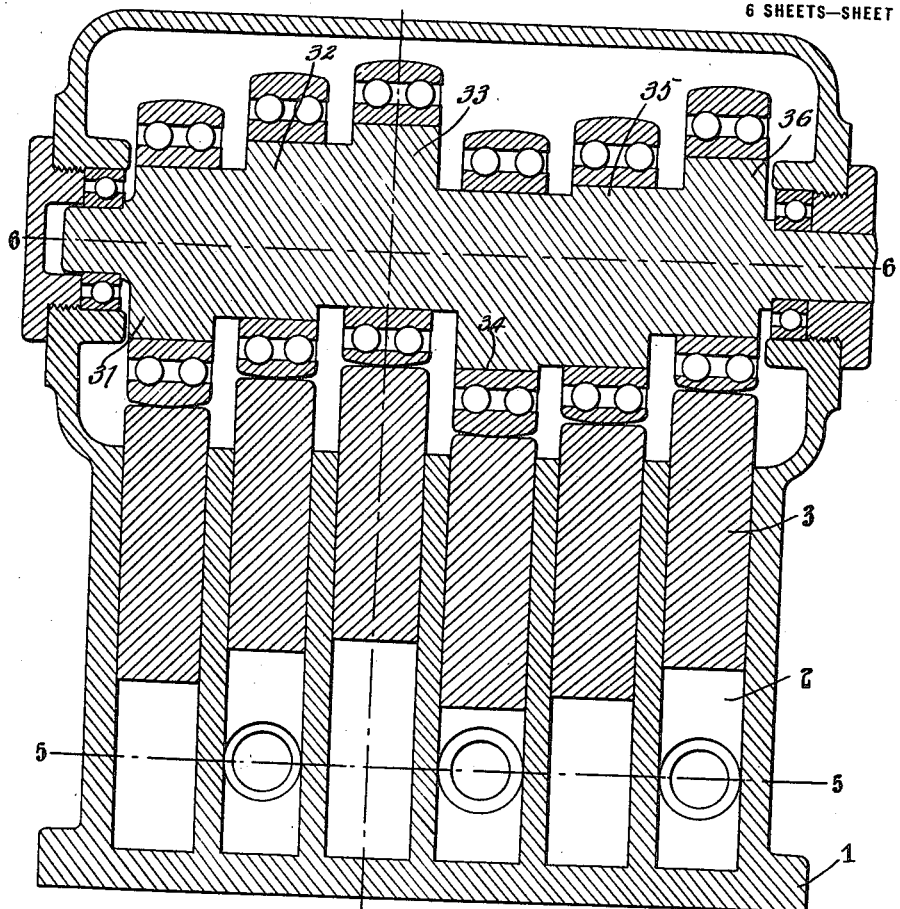
Figure 5:
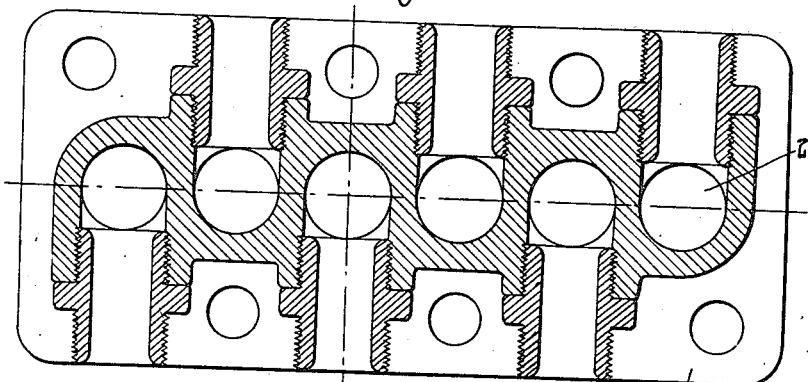
Figures 10, 12:
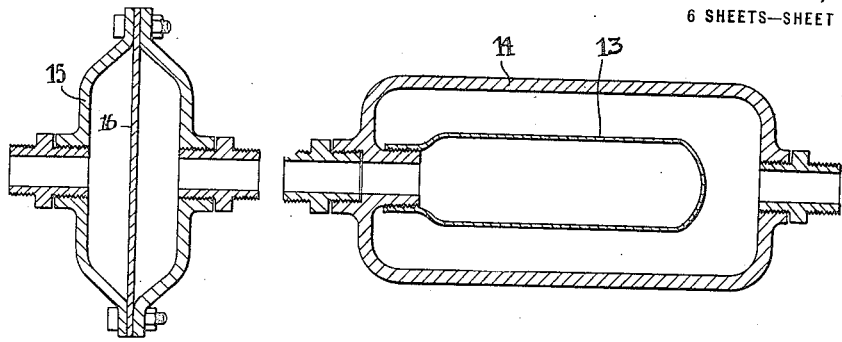
Figure 13:
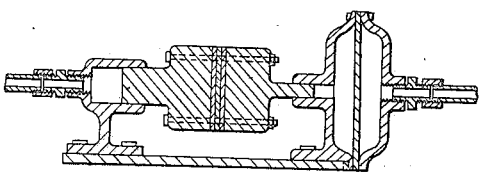
Figure 11:
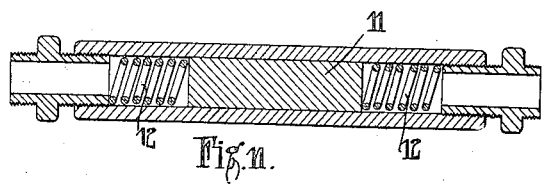

Referring to the accompanying diagrammatic drawings, Figure 1 is a sectional view, showing a generator and devices used in connection therewith. Fig. 2 is a similar view of a modified arrangement. Fig. 3 is a vertical section through the generator shown in Fig. 2. Fig. 4 is a section in a plane at right angles to Fig. 3. Fig. 5 is a sectional plan of the generator on the line 5 5, Fig. 3. Fig. 6 is a sectional plan on the line 6 6, Fig. 3. Fig. 7 is a diagrammatic view, showing methods of arranging condensers and inertia devices. Figs. 8 and 9 show respectively a condenser and an inertia device between two liquid columns. Fig. 10 shows a simple form of condenser, while Figs. 11 and 12 show modified forms. Fig. 13 shows a combined transformer, inertia device and condenser.

In carrying the invention into effect according to the example shown in Fig. 1, the generator $a$, comprises two reciprocating pistons $bb$, caused to reciprocate by rotating cams or eccentrics $c$, or other suitable means. The pistons work in two chambers $d$ $d$, each of which is connected by a length of piping $e$, to the receiver, which in this case will also have two pistons similar to those in the generator transmitting power in any suitable manner to the desired utilizer. In each of the pipes there is situated a vessel $f$, in which slides a differential piston $g$, whose larger end is toward the generator, the smaller end working in a cylinder of smaller diameter than the larger and transmitting the power to the column of liquid in the pipe beyond. In each pipe there is also situated a chamber $h$, divided by an elastic diaphragm $k$, which acts as a condenser. The motion of the liquid into the chamber on the generator side causes a movement of the membrane $k$, whose elasticity causes it to return and the membrane can thus be made to counteract the inertia of the column of liquid in the pipe. There may also be situated in each pipe a hydraulic device in the nature of an additional inertia device comprising a heavy piston $l$, having smaller pistons $mn$, and its ends sliding in cylinders, one of which is in communication with the generator side and the other with the receiver side of the pipe connections. It will be seen that in this arrangement the pulsations of the liquid caused by the generator are transformed by the differential piston to pulsations of higher pressure and the pulsations of liquid on one side of the diaphragm of the hydraulic condenser are transmitted to the other side; the recoil owing to its elasticity serving to give back to the column of liquid the energy which is taken up in its forward movement. The pulsation is thus transmitted to the receiver side of the condenser and the inertia of the liquid column can be counteracted.

It will be seen that a hydraulic condenser of the kind described above, arranged in the liquid column acts on the vibrations of the liquid column so as to annul the inertia of the column and it is advisable to regulate the elasticity and the length of the pipe and period of the pulsations so as to completely neutralize the high pressures which would arise owing to inertia of the column.

In order to obtain the correct relative values of elasticity and inertia the auxiliary inertia device consisting of a weighted piston may be varied so as to obtain complete neutralization of the effect due to the inertia of the liquid column and the elasticity of the condenser. By these two pieces of apparatus it is possible to obtain a periodic movement in the hydraulic column in which the natural period of the column with its condenser and additional inertia device is substantially the same as the period of the impulses given by the generator which depend on the speed with which it is run. In this manner the loss of power in transmission may be reduced to a minimum, the only losses being the losses due to the friction in the pipes.

According to the modification of the invention shown in Fig. 2 three liquid columns may be employed between the generator and receiver. The generator 1, see Figs. 3 to 6, in this case may consist of six cylinders 2, having reciprocating pistons 3. These reciprocating pistons are driven by eccentrics 31, 32, 33, 34, 35 and 36, so placed that the eccentrics of each pair 31, 32; 33, 34; 35, 36; differ in phase by 180°; while the pairs of eccentrics are arranged so that 31, 32, differ from 33, 34, and from 35, 36, by 120°. One of each pair of pistons would then be connected to each of the columns of liquid, 4, and the other three pistons would be connected to a common point 5.

The condensers 8 may if desired by placed with one side of each connecting to each of the pipes 39, 40, 41, leading to the three pipes 4, to which are connected one or more receivers. The other side of the condensers may be connected to a common point 42, as shown in Fig. 7, or if desired, the condensers 8 may be placed across branch pipes 43, 44, 45, leading from the pipes 4, as also shown in Fig. 7. Inertia devices 9 may be arranged in a similar manner across branch pipes 46, 47, 48, as also shown on Fig. 7. In Fig. 7, a receiver 50 is also shown diagrammatically, connected with the pipes 4.

It will be seen that various modifications of the invention may be made according to the most suitable method of transmitting the power in different circumstances. Further, it will be seen that the condenser 8, or additional inertia device 9, may be placed across two liquid columns $e$ $e$, if desired, as shown in Figs. 8 and 9.

In the arrangement of power transmission above described, condensers are used as shown at Fig. 10, consisting of a chamber 15, having within it an elastic diaphragm 16. A piston 11, may be used instead of the diaphragm, however, acted upon by suitable springs 12, which tend to keep it in a mean position, see Fig. 11, or if desired, an elastic chamber 13, inside a second chamber 14, may be employed, the inner chamber being connected to the generator and the outer chamber to the receiver or vice versa, see Fig. 12.

The transformer and inertia device may be combined as shown at Fig. 13, if desired.

By the system of transmission above described, power can be transmitted for a variety of purposes, and the invention is, therefore, of very wide application, and either high or low powers can be transmitted, such, for instance, as powers required to run machinery from a distance, or low powers, such as might be used in the transmission of sound through pipes containing liquid. This is effected by causing sound waves which are to be transmitted to act through a diaphragm or suitable device on one end of a liquid column, the diaphragm thus taking the place of the piston of the generator, the sound producing device acting itself as the generator of power. It will be seen that there will thus be impressed on the liquid column a series of periodic pressure variations, which are transmitted along the column in exactly the same manner as the periodic variations where higher powers for performing work are transmitted.

Having now described my invention what I claim as new and desire to secure by Letters Patent is:—

1. A hydraulic condenser comprising in combination, a chamber, a solid body elastically supported in both directions dividing said chamber, passages for liquid connected to said chamber on both sides of said solid body, said passages and chamber being adapted to contain liquid in contact with both ends of said solid body, as and for the purposes described.

2. A hydraulic condenser comprising in combination, a chamber, a piston in said chamber, springs on each side of said piston, pipes connected to said chamber on both sides of said piston, said pipes and said chamber being adapted to contain liquid in contact with both sides of said piston, as and for the purposes described.

3. Apparatus for the hydraulic transmission of power comprising in combination, a generator, a receiver, a pipe connecting said generator and said receiver, and a hydraulic condenser connected in said pipe, as set forth.

4. Apparatus for the hydraulic transmission of power comprising in combination, a generator, a receiver, a pipe connecting said generator and said receiver, a hydraulic condenser connected in said pipe, and an additional inertia device connected in said pipe, as set forth.

5. Apparatus for the hydraulic transmission of power comprising in combination, a generator, a receiver, a pipe connecting said generator and said receiver, a hydraulic condenser connected in said pipe, an additional inertia device connected in said pipe, said generator being adapted to produce periodic pressure variations in said pipe, and said hydraulic condenser and additional inertia device being so proportioned that the period of natural oscillation in the system is equal to the period of the expressed pressure variations, as set forth.

6. Apparatus for the hydraulic transmission of power comprising in combination, a generator, a receiver, a pipe connecting said generator and said receiver, a hydraulic condenser connected in said pipe, an additional inertia device connected in said pipe, and a hydraulic transformer connected in said pipe.

7. Apparatus for the hydraulic transmission of power comprising in combination, a generator, including three chambers, reciprocating pistons in said chambers, a receiver, including three chambers and reciprocating pistons in said chambers, three pipes, each connecting one of said chambers in said generator to one of said chambers in said receiver, hydraulic condensers connected in said pipes, the whole system being filled with liquid, as set forth.

8. Apparatus for the hydraulic transmission of power comprising in combination, a generator, including three chambers, reciprocating pistons in said chambers, a receiver including three chambers and reciprocating pistons in said chambers, three pipes, each connecting one of said chambers in said generator to one of said chambers in said receiver, hydraulic condensers connected in said pipes, inertia devices inserted in said pipes, the whole system being filled with liquid, as set forth.

9. Apparatus for the hydraulic transmission of power comprising in combination, a generator, including three chambers, reciprocating pistons in said chambers, a receiver, including three chambers and reciprocating pistons in said chambers, three pipes, each connecting one of said chambers in said generator to one of said chambers in said receiver, hydraulic condensers connected in said pipes, transformers inserted in said pipes, the whole system being filled with liquid, as set forth.

10. Apparatus for the hydraulic transmission of power, comprising in combination, a generator, including three pairs of chambers, pistons in said chambers, eccentrics coöperating with said pistons in said chambers, the eccentrics of each pair being 180° apart, and the eccentrics of the pairs being 120° apart, three pipes each connecting one chamber of each of said pairs to the corresponding chamber of a receiver, three pipes connecting the other three chambers to a common point, a receiver similar to said generator, and hydraulic condensers in the pipes between said generator and said receiver, as set forth.

In testimony whereof I have signed my name to this specification in the presence of two subscribing witnesses.

GOGU CONSTANTINESCO.

Witnesses:
    BERTRAM H. MATTHEWS,
    WALTER J. SKERTEN.